United States Patent
Hilditch et al.

(10) Patent No.: US 9,708,974 B2
(45) Date of Patent: Jul. 18, 2017

(54) LOW-PRESSURE EGR CONTROL DURING COMPRESSOR BYPASS VALVE OPERATION

(71) Applicant: Ford Global Technologies, LLC, Dearborn, MI (US)

(72) Inventors: James Alfred Hilditch, Canton, MI (US); Gopichandra Surnilla, West Bloomfield, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 13/746,232

(22) Filed: Jan. 21, 2013

(65) Prior Publication Data

US 2014/0202435 A1 Jul. 24, 2014

(51) Int. Cl.
F02B 47/08 (2006.01)
F02B 37/16 (2006.01)
(Continued)

(52) U.S. Cl.
CPC .............. F02B 47/08 (2013.01); F02B 37/16 (2013.01); F02D 41/005 (2013.01);
(Continued)

(58) Field of Classification Search
CPC ........... F02M 25/0756; F02M 25/0707; F02M 25/0772; F02M 25/0754; F02M 26/06;
(Continued)

(56) References Cited

U.S. PATENT DOCUMENTS 6,079,629 A * 6/2000 Morikawa .............. B60H 1/032
  237/12.3 C
6,948,475 B1 * 9/2005 Wong .................... F02D 19/024
  123/299

(Continued)

FOREIGN PATENT DOCUMENTS

EP 1607606 B1 9/2008
WO 2004044406 A1 5/2004

OTHER PUBLICATIONS

State Intellectual Property Office of the People's Republic of China, Office Action and Search Report Issued in Application No. 201410026129X, Apr. 25, 2017, 13 pages. (Submitted with Partial Translation).

*Primary Examiner* — Jacob Amick
(74) *Attorney, Agent, or Firm* — Julia Voutyras; McCoy Russell LLP

(57) ABSTRACT

A turbocharged engine system including a low-pressure exhaust gas recirculation (EGR) system and an intake oxygen sensor is described, along with methods for its operation. The system includes a compressor bypass valve arranged in a passage bypassing a turbocharger compressor, and an EGR valve arranged in an EGR system which may be adjusted to adjust an amount of exhaust gas recirculated to the engine intake. In one example method, over-dilution of an engine intake charge may be reduced by reducing EGR upon opening of the compressor bypass valve, and then increasing the EGR only after measurements from an intake oxygen sensor indicate that intake air dilution has decreased below a threshold.

19 Claims, 4 Drawing Sheets

(51) Int. Cl.
  *F02D 41/00* (2006.01)
  *F02D 41/14* (2006.01)
  *F02M 26/06* (2016.01)
  *F02B 37/12* (2006.01)

(52) U.S. Cl.
  CPC ....... *F02D 41/0007* (2013.01); *F02D 41/144* (2013.01); *F02M 26/06* (2016.02); *F02B 2037/125* (2013.01); *Y02T 10/144* (2013.01); *Y02T 10/47* (2013.01)

(58) Field of Classification Search
  CPC ...... F02M 26/13; F02M 26/09; F02D 41/005; F02D 41/0007; F02D 41/144; F02B 47/08; F02B 37/16
  USPC .......... 123/568.21, 568.18, 568.11; 60/605.2
  See application file for complete search history.

(56) References Cited

U.S. PATENT DOCUMENTS

| | | | |
|---|---|---|---|
| 7,150,264 B2 | 12/2006 | Kobayashi et al. | |
| 7,571,608 B2* | 8/2009 | Boyapati | F01N 3/021 123/562 |
| 7,814,752 B2* | 10/2010 | Hu | F02B 37/16 123/568.12 |
| 8,001,778 B2* | 8/2011 | Sun | F02B 37/16 123/568.11 |
| 8,365,528 B2* | 2/2013 | Leone | F02D 13/0219 123/90.15 |
| 8,733,320 B2* | 5/2014 | Surnilla | F01N 3/2066 123/406.23 |
| 2005/0193978 A1* | 9/2005 | Ishikawa | F02D 41/0052 123/399 |
| 2007/0119413 A1* | 5/2007 | Lewis | F02D 41/0025 123/295 |
| 2010/0170460 A1* | 7/2010 | Leone | F02D 13/0249 123/90.16 |
| 2011/0072793 A1 | 3/2011 | Bidner et al. | |
| 2011/0162628 A1* | 7/2011 | Kurtz | F02D 41/005 123/672 |
| 2011/0184632 A1 | 7/2011 | Kang et al. | |
| 2011/0209690 A1 | 9/2011 | Ulrey et al. | |
| 2011/0239997 A1 | 10/2011 | Surnilla et al. | |
| 2011/0270511 A1* | 11/2011 | Kurtz | F02M 26/15 701/105 |
| 2014/0202435 A1* | 7/2014 | Hilditch | F02B 47/08 123/568.21 |

* cited by examiner

LOW-PRESSURE EGR CONTROL DURING COMPRESSOR BYPASS VALVE OPERATION

TECHNICAL FIELD

The present application relates generally to controlling low-pressure exhaust gas recirculation during operation of a compressor bypass valve in an internal combustion engine.

BACKGROUND AND SUMMARY

Engine systems may utilize recirculation of exhaust gas from an engine exhaust system to an engine intake system, a process referred to as exhaust gas recirculation (EGR), to reduce regulated emissions. For example, a turbocharged engine system may include a low-pressure (LP) EGR system which recirculates exhaust gas from the exhaust system to the intake passage upstream of a turbocharger compressor. Accordingly, exhaust gas may be recirculated into a low-pressure air induction system (LP AIS) upstream of the compressor, resulting in a compressed mixture of fresh intake air and EGR downstream of the compressor. An EGR valve may be controlled to achieve a desired intake air dilution, the desired intake air dilution based on engine operating conditions.

However, turbocharged engine systems may also include a compressor bypass valve (CBV). Among other functions, the CBV may serve to reduce compressor surge during certain conditions by recirculating the intake mixture downstream of the compressor back to the intake passage upstream of the compressor. As a result, the intake mixture entering the compressor during open CBV conditions may include a higher proportion of EGR (e.g., a higher intake air dilution) relative to the intake mixture entering the compressor when the CBV is closed, because it includes the EGR/fresh air mixture recirculated from downstream of the compressor due to the open CBV as well as additional EGR from the LP EGR system. Therefore, if no action is taken to address this issue, the desired intake air dilution may not be achieved, and engine performance may be degraded.

The inventors herein have recognized the above issue and have devised various approaches to at least partially address it. In one example approach, LP EGR may be reduced upon opening of a CBV (e.g., opening of a CBV during tip out to reduce compressor surge). In this way, over-dilution of the intake charge may be reduced by recirculating less exhaust, or even no exhaust, to the intake passage during conditions where an air/EGR mixture is already flowing from downstream of the compressor to upstream of the compressor by way of the open CBV. Then, after closing of the CBV (e.g., closing of the CBV after a compressor surge risk estimate has fallen below a threshold), it may be determined whether intake air dilution has decreased below a threshold based on measurements taken by an intake oxygen sensor arranged downstream of the compressor. If so, depending on the threshold, little or no EGR may be present in the intake air, and thus EGR may be increased (e.g., to achieve a desired intake air dilution) without the risk of over-dilution of the intake charge (which may undesirably degrade engine performance). As a further advantage of this approach, undesirable EGR backflow may be reduced during compressor surge conditions due to the reduction in opening of the EGR valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
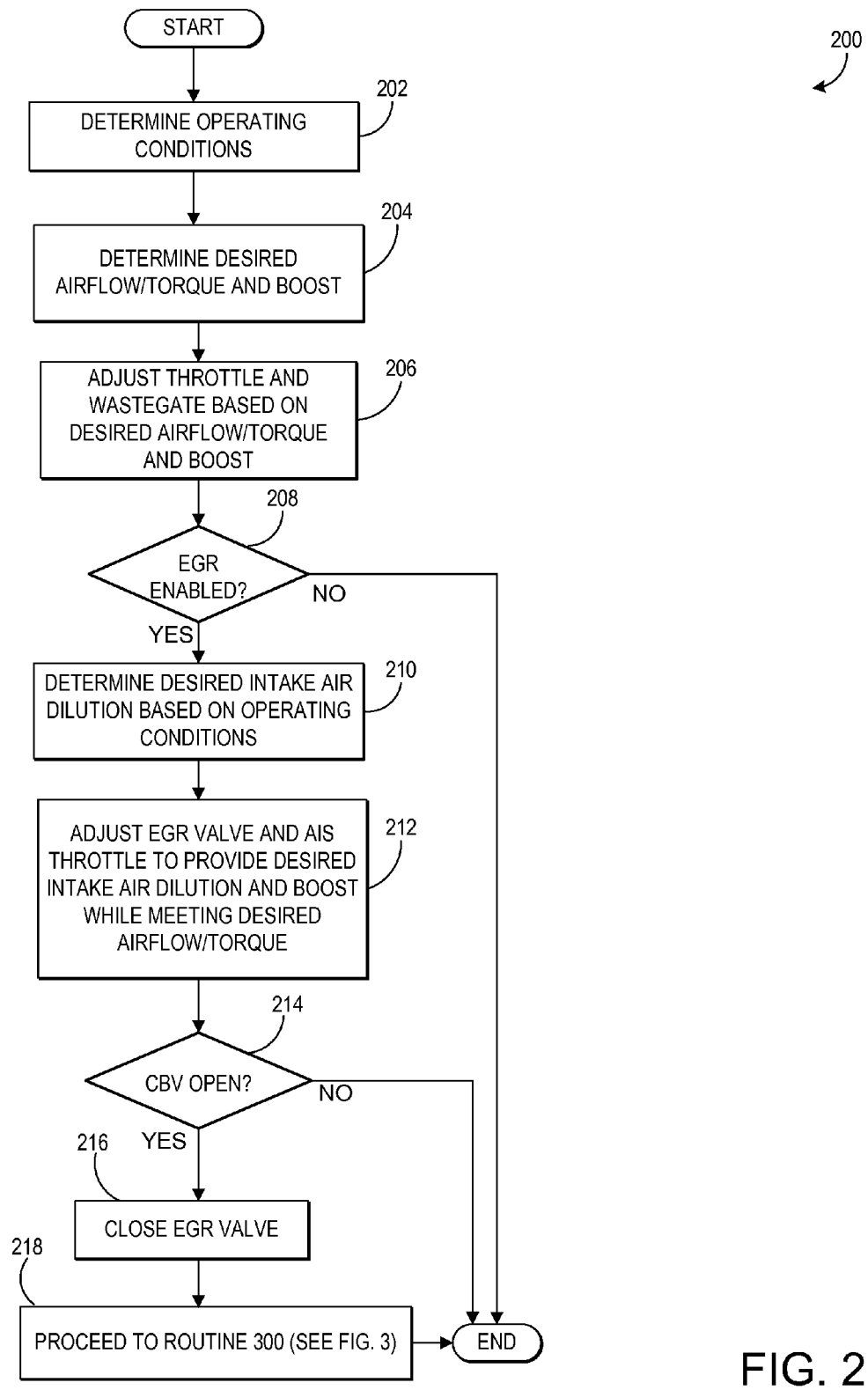
FIG. 2 shows a routine for controlling an engine system, such as the engine system of FIG. 1, to avoid over-dilution of engine intake air.
Figure 3:
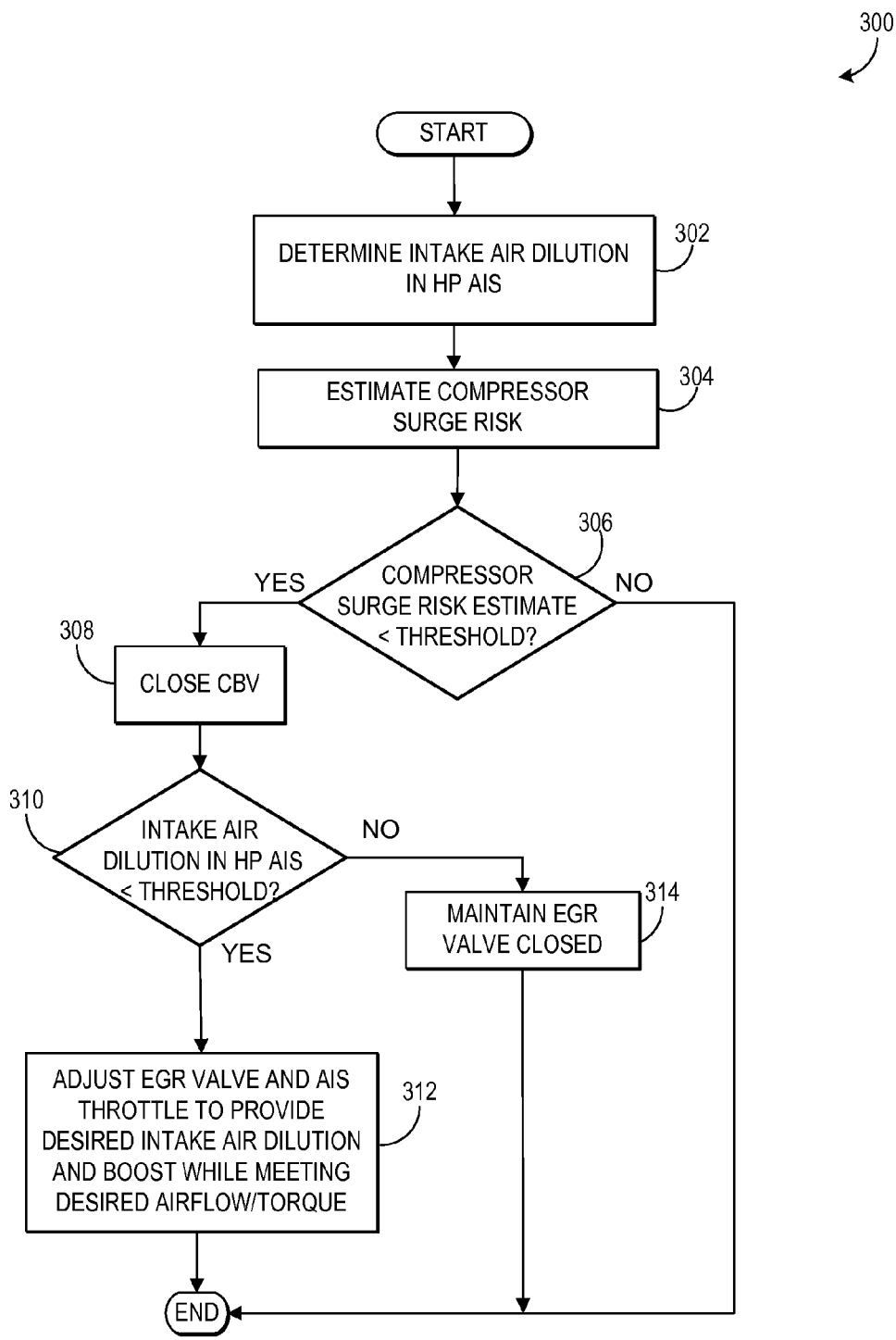
FIG. 3 shows a routine for coordinating CBV opening with EGR valve adjustment and based on intake air dilution, which may be performed in conjunction with the routine of FIG. 2.

The following description relates to controlling LP EGR during operation of a CBV in an internal combustion engine. As shown in the example embodiment of FIG. 1, an engine system may include two branches, each equipped with a turbocharger and EGR system. An intake oxygen sensor arranged downstream of the compressors may measure intake air dilution, which may serve as a basis for adjustment of the CBV(s) as well as EGR as detailed with regard to the routines of FIGS. 2 and 3. For example, as shown in FIGS. 2 and 3, upon opening of the CBV, the EGR valve may be closed to avoid over-dilution of the intake charge. As shown in the timing diagrams of FIG. 4, once the CBV is closed (e.g., due to a compressor surge risk estimate falling below a threshold), and once the measured intake air dilution reflects that the intake system contains little or no EGR, EGR may be increased as needed to achieve a desired intake air dilution without risking over-dilution of the intake charge.

Figure 1:
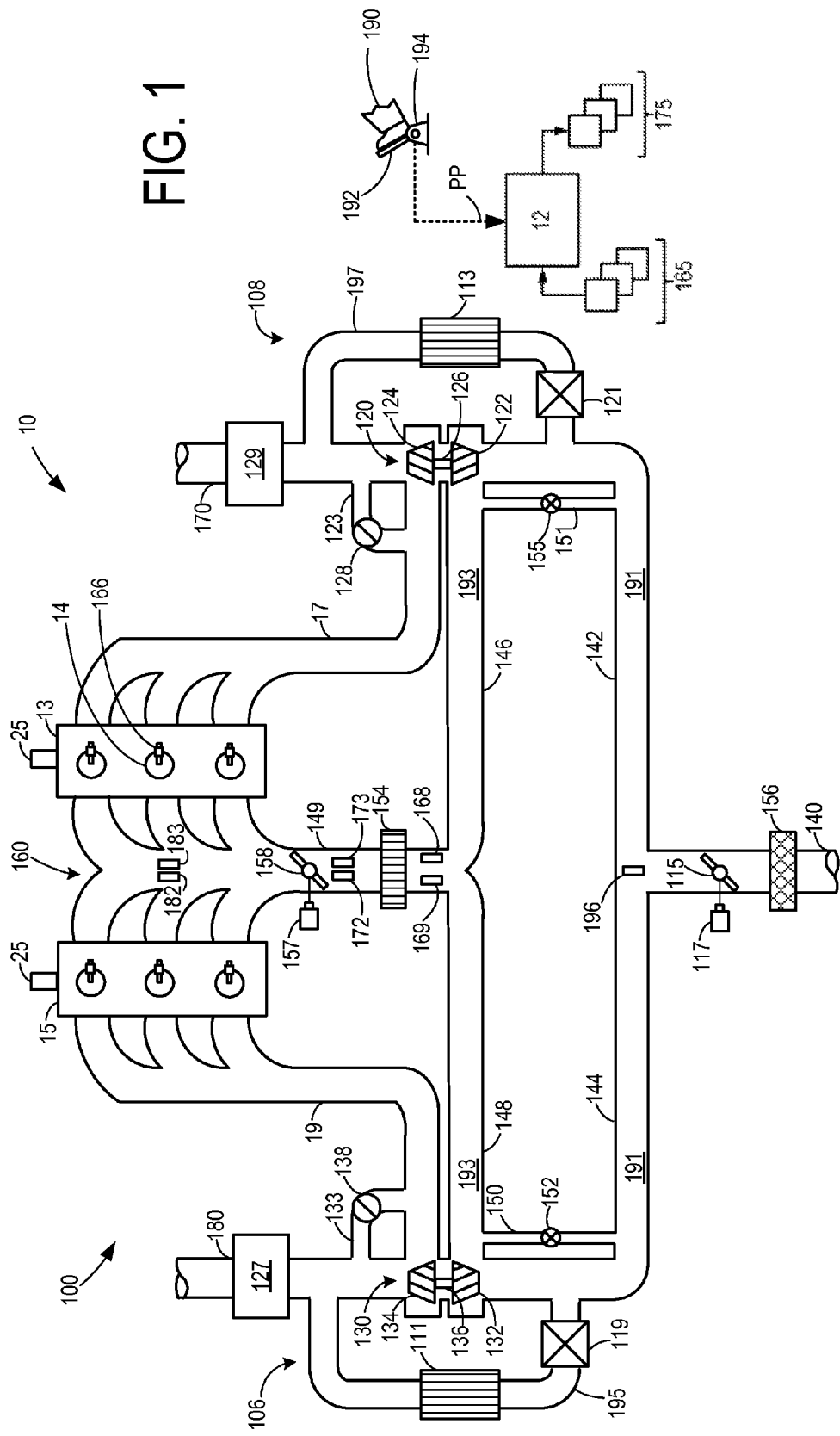
FIG. 1 shows a schematic diagram of a twin-turbocharged engine system, including an LP EGR system and an intake oxygen sensor.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described below as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2 and 3.

Engine system 100 may receive intake air via intake passage 140. As shown in FIG. 1, intake passage 140 may include an air filter 156 and an air induction system (AIS) throttle 115. AIS throttle 115 may be configured to adjust and control the amount of LP EGR flow. The position of AIS throttle 115 may be adjusted by the control system via a throttle actuator 117 communicatively coupled to controller 12.

At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown in FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 144 upstream of compressor 132, and a downstream end of CBV passage 150 may be coupled with intake passage 148 downstream of compressor 132. Similarly, an upstream end of a CBV passage 151 may be coupled with intake passage 142 upstream of compressor 122, and a downstream end of CBV passage 151 may be coupled with intake passage 146 downstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a LP AIS pressure sensor 196 is arranged at a juncture of intake passages 140, 142, and 144, and an HP AIS pressure sensor 169 is arranged in intake passage 149. However, in other anticipated embodiments, sensors 196 and 169 may be arranged at other locations within the LP AIS and HP AIS, respectively. Among other functions, measurements from LP AIS pressure sensor 196 and HP AIS pressure sensor 169 may be used to determine compressor pressure ratio, which may in factor into an estimate of compressor surge risk.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 170 downstream of turbine 134, while combustion products exhausted via exhaust passage 19 may be directed to the atmosphere via exhaust passage 180 downstream of turbine 124. Exhaust passages 170 and 180 may include one or more exhaust after-treatment devices, such as a catalyst, and one or more exhaust gas sensors. For example, as shown in FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes low-pressure (LP) EGR systems 106 and 108. LP EGR system 106 routes a desired portion of exhaust gas from exhaust passage 180 to intake passage 144, whereas LP EGR system 108 routes a desired portion of exhaust gas from exhaust passage 170 to intake passage 142. In the depicted embodiment, EGR is routed in an EGR passage 195 from downstream of turbine 134 to intake passage 144 at a mixing point located upstream of compressor 132. Similarly, EGR is routed in an EGR passage 197 from downstream of turbine 124 to intake passage 142 at a mixing point located upstream of compressor 122. The amount of EGR provided to intake passages 144 and 142 may be varied by the controller 12 via EGR valves 119 and 121 coupled in the LP EGR systems 106 and 108, respectively. In the example embodiment shown in FIG. 1, LP EGR system 106 includes an EGR cooler 111 positioned upstream of EGR valve 119, and LP EGR system 108 includes an EGR cooler 113 positioned upstream of EGR valve 121. EGR coolers 111 and 113 may reject heat from the recirculated exhaust gas to engine coolant, for example.

EGR valves 119 and 121 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that CBV position, AIS throttle position, and wastegate position may also affect the EGR dilution percentage of the intake charge. For example, there may be a risk of over-dilution of intake air when the CBV changes state (e.g. switches from closed to open, or from partially closed to more open). When the CBV is opened, a mixture of EGR and fresh air may be recirculated back to the intake passage upstream of the compressor, which may increase the EGR dilution percentage if the EGR valve remains open to add further EGR to the intake charge upstream of the compressor. In contrast, while the CBV remains in a fixed position—either open, closed, or partially open—EGR control may not be affected. As another example, AIS throttle position may affect the flow of fresh air into the intake system; more fresh air flow into the intake system may decrease the EGR dilution percentage, whereas less fresh air flow into the intake system may increase the EGR dilution percentage. As yet another example, wastegate position may affect exhaust backpressure; if the EGR valve is not fully closed, exhaust backpressure may affect the EGR flow to the intake system. Accordingly, as will be detailed below, EGR dilution of the intake charge may be controlled via control of one or more of EGR valve position, CBV position, AIS throttle position, and wastegate position, among other parameters.

The EGR dilution percentage of the intake charge at a given time (e.g., the proportion of combusted gases to air in an intake passage of the engine) may be inferred from the output of an intake oxygen sensor 168. In the depicted embodiment, the intake oxygen sensor is positioned at a juncture of intake passages 146, 148, and 149 and upstream of air cooler 154. However, in other embodiments, sensor 168 may be arranged downstream of air cooler 154, or at another location along intake passage 149. Intake oxygen sensor 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 119, EGR valve 121, AIS throttle 115, CBV 152, CBV 155, wastegate 138, and wastegate 128 to achieve a desired EGR dilution percentage of the intake charge.

It will be appreciated that in alternative embodiments, engine 10 may include one or more high pressure (HP) EGR systems as well as the LP EGR systems, to divert at least some exhaust gas from the engine exhaust passages, upstream of the turbines, to the engine intake, downstream of the compressors.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor.

FIG. 2 shows a flow chart illustrating a routine 200 for controlling an engine system such as engine system 100 of FIG. 1 during tip out. When tip out occurs while EGR is enabled, routine 200 coordinates surge-reducing CBV opening with EGR valve adjustment and based on intake air dilution (e.g., as measured by an intake oxygen sensor arranged in a HP AIS system). Such control may reduce over-dilution of intake air during open CBV conditions when a fresh air/EGR mixture recirculates from downstream of the compressor to upstream of the compressor.

It will be appreciated that in an engine system with twin turbochargers, such as engine system 100 of FIG. 1, routine 200 may be performed at both branches of the intake system, or at only one branch.

At 202, operating conditions are determined. As non-limiting examples, the operating conditions may include ambient temperature and pressure, boost, EGR valve position, intake oxygen concentration in the LP AIS system, pedal position (PP), engine speed, engine load, engine temperature, etc.

Once the operating conditions are determined, the routine continues to 204 where desired airflow/torque and boost are determined. For example, desired airflow/torque may be determined based on pedal position (e.g., signal PP of FIG. 1). Further, desired boost may be determined by referencing boost values corresponding to current engine operating conditions (e.g., the operating conditions determined at 202) in a lookup table stored in memory, in one example.

After 204, the routine continues to 206 to adjust the throttle and turbocharger turbine wastegate based on the desired airflow/torque and boost determined at 204. For example, this may include increasing opening of throttle 158 of FIG. 1 if desired airflow/torque is greater than current airflow/torque, and decreasing opening of a wastegate (e.g., one or both of wastegates 138 and 128 of FIG. 1) if the wastegate position which will provide the desired boost is a less open position than the current wastegate position. As another example, adjusting the throttle and turbocharger turbine wastegate based on the desired airflow/torque and boost may include decreasing opening of throttle 158 of FIG. 1 if desired airflow/torque is less than current airflow/torque, and increasing opening of a wastegate (e.g., one or both of wastegates 138 and 128 of FIG. 1) if the wastegate position which will provide the desired boost is a more open position than the current wastegate position After 206, the routine continues to 208 where it is determined whether EGR is enabled. For example, in a twin-turbocharged system such as engine system 100 of FIG. 1, EGR may be enabled at a given intake branch when the EGR valve for that branch is open, whereas EGR may not be enabled at that branch when the corresponding EGR valve is closed.

If the answer at 208 is YES indicating that EGR is enabled, the routine continues to 210 to determine the desired EGR based on operating conditions (e.g., the operating conditions determined at 202). For example, this may include determining an amount of exhaust to recirculate to the intake system to achieve a desired intake air dilution, the desired intake air dilution based on engine speed, engine load, engine temperature, and other engine operating conditions. Further, this may include determining a position of the EGR valve which will achieve the desired EGR.

After 210, the routine continues to 212 to adjust the EGR valve and the AIS throttle to provide the desired EGR (as determined at 210) and the desired boost (as determined at 204) while meeting the requested airflow/torque. Adjusting the EGR valve may include increasing or decreasing the flow of exhaust gas from an exhaust passage. For example, the controller may send a signal to change an opening amount of one or both of EGR valves 119 and 121 of FIG. 1 based on the desired EGR within a range corresponding to the requested airflow/torque. Further, the controller may send a signal to adjust a position of AIS throttle 15 of FIG. 1 (e.g., to increase or decrease the flow of fresh air entering the intake system) based on the desired EGR and the desired boost, within a range corresponding to the requested airflow/torque. Thus, during conditions where it is desirable to increase airflow through the AIS throttle to increase boost, EGR may be increased as well by increasing the opening amount of the EGR valve to achieve a desired intake air dilution. Such control may improve engine performance and reduce emissions by enabling boosting while preserving a desired intake air dilution.

After 212, the routine continues to 214 to determine whether the CBV is open. This determination may be made by the control system, e.g. based on a signal from a CBV position sensor or based on prior control of the CBV by the control system in the case of active CBV control. As will be detailed below, the CBV may be open during conditions where compressor surge risk is above a threshold, where compressor surge risk is based on volumetric airflow through the compressor and compressor pressure ratio, among other factors.

If the answer at 214 is YES, the routine continues to 216 to close the EGR valve. For example, the controller may send a signal to one or more of EGR valves 119 and 121 to at least partially close the valve(s). When EGR is enabled and the CBV is open, it may be advantageous to close the EGR valve, as this action may reduce the possibility of over-dilution of the EGR/air mixture in the intake system by reducing the recirculation of exhaust gas into the intake system. Further, closing the EGR valve while the CBV is open may advantageously reduce undesirable backflow through the EGR passage (e.g., flow from the intake system to the exhaust system resulting when intake system pressure exceeds exhaust system pressure).

After 216, at step 218, routine 200 proceeds to routine 300. As shown in FIG. 3 and described below, routine 300 is a control strategy enacted during tip out while EGR is enabled which may reduce over-dilution of the engine intake charge via monitoring of the oxygen concentration of the intake air/EGR mixture in the HP AIS. After 218, routine 200 ends.

Otherwise, if the answer at 214 is NO indicating that the CBV is not open, method 200 ends.

Returning to 208, if the answer is NO indicating that EGR is not enabled, method 200 ends.

Continuing with FIG. 3, it shows a flow chart illustrating a routine 300 for coordinating CBV opening with EGR valve adjustment and based on intake air dilution (e.g., as measured by an intake oxygen sensor in an HP AIS). Routine 300 may be performed during driver tip out when EGR is enabled, e.g. at step 218 of routine 200.

It will be appreciated that in an engine system with twin turbochargers, such as engine system 100 of FIG. 1, routine 300 may be performed at both branches of the intake system, or at only one branch.

At 302, routine 300 includes determining intake air dilution in the HP AIS. For example, intake air dilution may be estimated or inferred based on measurements of oxygen concentration in the HP AIS, e.g. measurements from intake oxygen sensor 168 in the context of FIG. 1. It will be appreciated that in some embodiments, measurements from an intake oxygen sensor may be corrected based on other engine operating parameters such as measured pressures within the intake system, and the corrected measurements may provide a more accurate intake air dilution measurement.

After 302, routine 300 continues to 304 to estimate compressor surge risk. Compressor surge risk may be based on various factors, including volumetric airflow through the compressor and compressor pressure ratio (e.g., a pressure ratio across compressor 122 and/or compressor 132 which may be determined based on pressure values sensed by LP AIS pressure sensor 196 and HP AIS pressure sensor 169).

After 304, routine 300 continues to 306 to determine whether the compressor surge risk estimate is less than a threshold. For example, the threshold may be a risk level above which undesirable compressor surge is likely (e.g., due to various factors such as volumetric air flow and compressor pressure ratio). For example, controller 12 may generate an interrupt when the compressor surge risk estimate is reduced from above the threshold to below the threshold, and a routine initiated by the interrupt may include closing the CBV (e.g., step 308 described below). Alternatively, the compressor surge risk estimate may be stored in memory of controller 12 and updated at predetermined intervals based on measured and/or estimated values of various parameters such as volumetric airflow and compressor pressure ratio. In this case, controller 12 may poll the stored compressor surge risk estimate at predetermined intervals, or continually, to determine when the estimate has reduced below the threshold.

If the answer at 306 is NO indicating that the compressor surge risk estimate is not below the threshold, routine 300 ends (e.g., with the CBV remaining open to counteract surge). Otherwise, if the answer at 306 is YES, routine 300 proceeds to 308 to close the CBV. After closure of the CBV, the intake air/EGR mixture in the HP AIS (which may or may not still include EGR) may no longer flow from downstream of the compressor to upstream of the compressor, depending on whether the CBV is fully or partially closed. It will be appreciated that in some examples, the CBV may remain at least partially open even when compressor surge risk is not present, to reduce the possibility of surge. In such examples, "closure of the CBV" may refer to partial closure of the CBV. Further, the CBV may be controlled based on factors other than compressor surge risk without departing from the scope of this disclosure.

After 308, routine 300 proceeds to 310 to determine whether intake air dilution in the HP AIS is less than a threshold. For example, the intake air dilution determined at step 302 may be compared with a threshold. The threshold may be an intake air dilution which indicates that only trace amounts of EGR remain in the HP AIS, or that no EGR remains in the HP AIS (e.g., based on measurements from an intake oxygen sensor arranged in the HP AIS such as sensor 168 of FIG. 1). As will be described below with respect to the timing diagrams depicted in FIG. 4, intake air dilution in the HP AIS falling below the threshold may indicate that a tail end of an EGR "slug" has entered the engine (the EGR slug being a mixture of air and EGR wherein the dilution of the air by the EGR exceeds the threshold). At this point, EGR mixed with intake air and recirculated back into the LP AIS via the CBV, after closing of the EGR valve and before closing of the CBV, has passed through the compressor into the HP AIS and then into the engine for combustion.

If the answer at 310 is NO, e.g. indicating that the tail end of the EGR slug has not yet entered the engine, routine 300 proceeds to 314 to maintain the EGR valve closed. In this way, recirculation of exhaust gas from the exhaust system to the intake system may be suppressed until the EGR/air mixture recirculated from downstream of the compressor to upstream of the compressor via the open CBV contains only a trace of EGR (or no EGR), so as to reduce over-dilution of the engine intake charge. At this time, the LP AIS system may include undiluted intake air (e.g., air which is not mixed with EGR) due to both the CBV and the EGR valve being closed. After 314, method 300 ends. It will be appreciated that at a subsequent execution of routine 300 by the controller, the answer at 310 may be YES once the undiluted intake air travels through the compressor into the HP AIS, as the intake oxygen sensor in the HP AIS will measure trace amounts of EGR or no EGR in the intake air and thus will likely measure intake air dilution as being below the threshold.

Otherwise, if the answer at 310 is YES, routine 300 continues to 312 to adjust the EGR valve and the AIS throttle to provide the desired intake air dilution and boost (e.g., as determined at steps 210 and 204 of routine 200, respectively) while still meeting the desired airflow/torque (e.g., as determined at step 204 of routine 200). For example, as described above for step 212 of routine 200, the controller may send a signal to change an opening amount of one or both of EGR valves 119 and 121 of FIG. 1 based on the desired intake air dilution within a range corresponding to the requested airflow/torque. Further, the controller may send a signal to adjust a position of AIS throttle 15 of FIG. 1 based on the desired intake air dilution and the desired boost, within a range corresponding to the requested airflow/torque. Accordingly, once the CBV has been closed, and once the tail end of the EGR slug has passed through the HP AIS and into the engine, the EGR valve and AIS throttle may again be adjusted to achieve a desired intake air dilution. After 312, method 300 ends.

Figure 4:
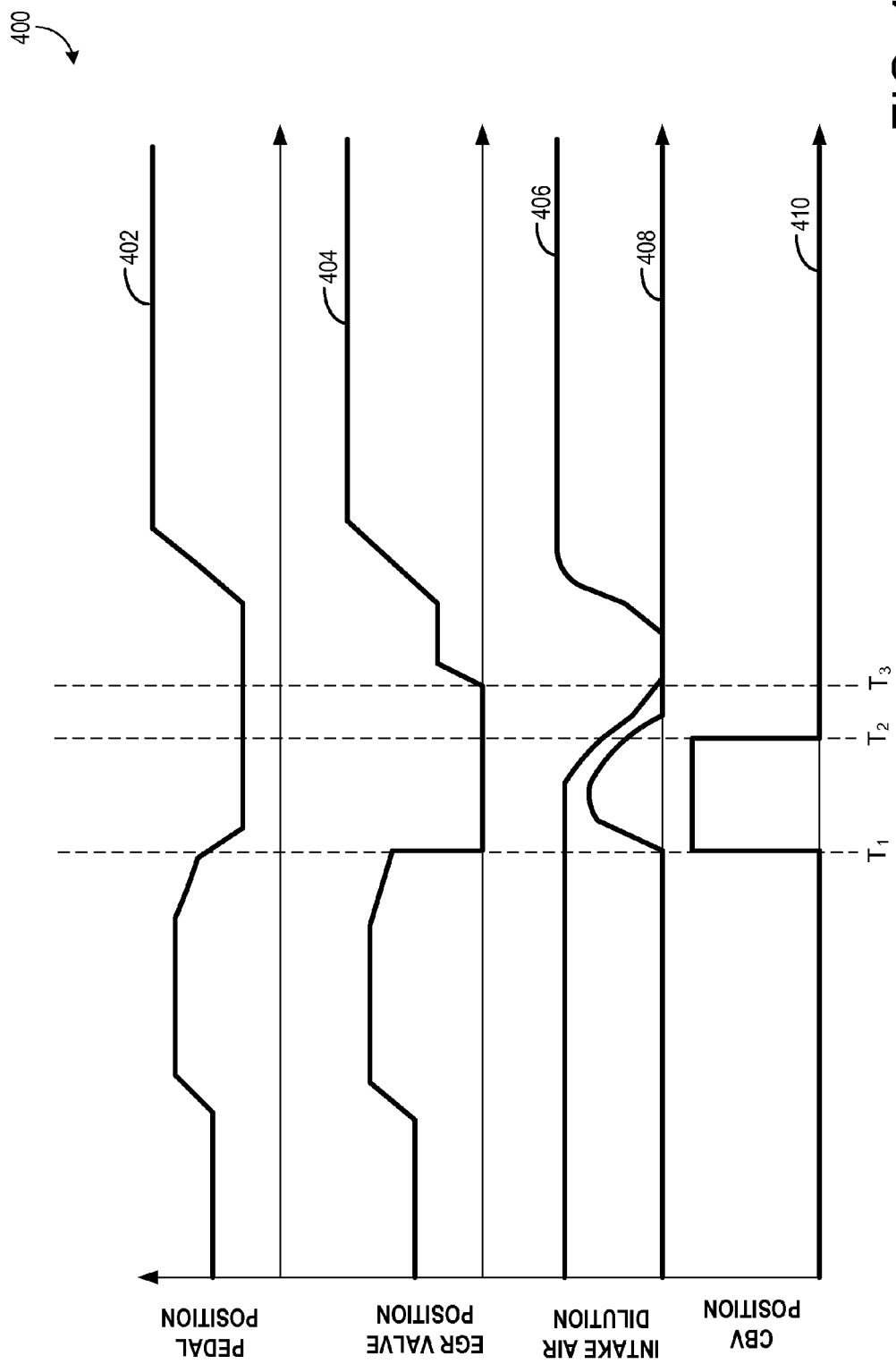
FIG. 4 shows a timing diagram for pedal position, EGR valve position, intake air dilution, and CBV position, which may correspond to the engine system of FIG. 1 and the routines of FIGS. 2 and 3.

FIG. 4 is a diagram 400 illustrating pedal position, EGR valve position, intake air dilution, and CBV position according to one example embodiment of the present disclosure. Time is depicted on the horizontal axis, and pedal position (PP), EGR valve position, intake air dilution, and CBV position are depicted on the vertical axis. Curve 402 depicts pedal position, curve 404 depicts EGR valve position, curve 406 depicts intake air dilution in the HP AIS (e.g., as measured by intake oxygen sensor 168), curve 408 depicts intake air dilution in the LP AIS, and curve 410 depicts CBV position.

Referring to curve 402, the position of a driver-actuated accelerator pedal (e.g., input device 192 of FIG. 1) is depicted. As shown, prior to time $T_1$, the pedal may be further depressed relative to its initial position (via "tip in" by a vehicle operator, e.g. to increase the vehicle's speed or to maintain a current vehicle speed while driving uphill) and then partially released (via partial "tip out" by the vehicle operator, e.g. to slow down the vehicle's speed or to maintain a current vehicle speed while driving downhill). At time $T_1$, further driver "tip out" occurs when the vehicle operator releases the pedal further, as shown by the steeper negative slope of curve 402 starting at time $T_1$. After this tip out, the pedal position remains constant until driver "tip in" occurs after time $T_3$.

Referring now to curve 404, the position of an EGR valve such as EGR valve 119 or 121 of FIG. 1 is depicted. As shown, prior to time $T_1$ and after time $T_3$, an opening amount of the EGR valve may roughly track pedal position, and thus the EGR valve may open and close according to engine torque, airflow, and EGR rate commands issued by the control system based on pedal position. However, between time $T_1$ and time $T_3$, the EGR valve may be controlled based on CBV position and intake air dilution, as will be detailed below.

Curve 406 depicts intake air dilution in the HP AIS (as well as in the LP AIS downstream of a juncture of the EGR passage and the intake passage), while curve 408 depicts intake air dilution in the LP AIS. For example, in the context of FIG. 1, the intake air dilution represented by curve 406 may be measured by intake oxygen sensor 168.

Continuing to curve 410, the position of a CBV such as CBV 152 or 155 of FIG. 1 is depicted. As detailed below, changes in CBV position may trigger changes in EGR valve position.

The interplay of CBV position, intake air dilution, and EGR valve position during the depicted duration will now be described. As shown, prior to time $T_1$, the CBV is in a closed position as shown by curve 410. The CBV may be closed due to a compressor surge risk estimate being below a threshold, or for other reasons. Further, prior to time $T_1$, the EGR valve is open to varying degrees as it tracks pedal position. As the CBV is closed prior to time $T_1$, fresh air alone may enter the intake passage upstream of the juncture of the EGR passage and the intake passage; an air/EGR mix does not recirculate from downstream of the compressor to upstream of the compressor via the CBV passage due to the closure of the CBV. Accordingly, as shown by curve 408, intake air in the LP AIS upstream of the EGR passage entry may not be diluted with exhaust gas prior to time $T_1$. In contrast, as shown by curve 406, the intake air in the HP AIS (as well as the intake air in the LP AIS downstream of the juncture of the EGR passage and the intake passage) may be diluted with EGR due to the EGR valve being open to varying degrees prior to time $T_1$.

At time $T_1$, the CBV is opened. The CBV may be opened at time $T_1$ due to the compressor surge risk estimate increasing above the threshold, or for other reasons. As shown, the EGR valve is triggered to close upon opening of the CBV. Despite the closing of the EGR valve at time $T_1$, intake air dilution in the HP AIS remains constant for a duration after time $T_1$, due to a transport delay between the EGR entry and the intake air dilution measurement location (e.g., sensor 168 of FIG. 1). After the duration, despite the increased intake air dilution upstream of the EGR entry after time $T_1$, the closing of the EGR valve may result in a decrease in intake air dilution in the HP AIS (as shown by the negative slope of curve 406 prior to time $T_2$). This may be due to the relative sizes (e.g., diameters) of the EGR and CBV passages; as shown in FIG. 1, the CBV passage(s) may be smaller than the EGR passage(s), and thus the addition of an air/EGR mixture into the intake passage via the CBV passage may not increase intake air dilution sufficiently to compensate for the decrease in intake air dilution resulting from the closure of the EGR valve.

Meanwhile, as shown by curve 408, intake air dilution in the LP AIS increases after time $T_1$, as diluted air from the HP AIS is recirculated to the LP AIS via the open CBV. In some examples, the intake air dilution in the LP AIS may reach a magnitude as high as the magnitude of the intake air dilution in the HP AIS prior to opening of the CBV. As the intake air dilution in the HP AIS begins decreasing (after the transport delay), the intake air dilution in the LP AIS also begins decreasing, as less-diluted air is recirculated from the HP AIS to the LP AIS and fresh air enters the LP AIS through intake passage 140 of FIG. 1.

At time $T_2$, the CBV is closed (e.g., due to the compressor surge risk estimate falling below the threshold, or due to other factors), and it remains closed for the remainder of the depicted duration. However, the EGR valve remains closed until the HP AIS dilution level drops below a threshold (e.g., as described above for step 310 of method 300). The intake air dilution in the HP AIS, as well as the LP AIS, continues to decrease after time $T_2$ due to the transport delay, as the remainder of the diluted air passes through the intake system and into the engine. Prior to time $T_3$, the intake air dilution in the LP AIS decreases to a minimum value (e.g., 0% dilution), as the final traces of EGR-diluted intake air have passed through the compressor into the HP AIS. Because the CBV remains closed for the remainder of the depicted time, intake air dilution in the LP AIS upstream of the EGR entry reduces to a baseline level and stays there. It will be appreciated that intake air dilution in the HP AIS has not yet reached the minimum value prior to time $T_3$, due to the transport delay.

At time $T_3$, all of the EGR present in the intake system since the closure of the CBV valve at time $T_2$ has passed through the HP AIS and into the engine for combustion, and thus intake air dilution in the HP AIS decreases to the minimum value. For example, only trace amounts of exhaust gas—or no exhaust gas—may be present in the HP AIS at time $T_3$. The intake air dilution value of curve 406 at time $T_3$ may be the threshold referenced at step 310 of routine 300. Accordingly, at time $T_3$, an opening amount of the EGR valve may be increased as shown by curve 404. For example, the EGR valve opening amount may be controlled to roughly track pedal position, as discussed above for the interval before time $T_1$. As shown by curve 406, after time $T_3$, intake air dilution in the HP AIS remains at the minimum value due to a transport delay (e.g., as the EGR introduced into the intake passage upon opening of the EGR valve at time $T_3$ travels from the LP AIS to the HP AIS). After the transport delay, as shown, intake air dilution in the HP AIS increases to the same level it was at prior to time $T_1$, which may be a desired intake air dilution.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for exhaust gas recirculation (EGR) control in a turbocharged engine, comprising:
    reducing low-pressure EGR by decreasing opening of an EGR valve upon increasing opening of a compressor bypass valve (CBV);
    reducing opening of the CBV; and
    after reducing opening of the CBV, increasing opening of the EGR valve only after intake air dilution measured by an intake oxygen sensor downstream of a turbocharger compressor and upstream of an intake throttle decreases below a threshold.

2. The method of claim 1, wherein reducing opening of the CBV comprises reducing opening of the CBV when an estimate of compressor surge risk decreases below a threshold.

3. The method of claim 2, wherein increasing EGR only after the intake air dilution decreases below the threshold further comprises:
    adjusting an opening amount of the EGR valve based on a desired intake air dilution only after the intake air dilution decreases below the threshold.

4. The method of claim 3, further comprising maintaining reduced EGR when the intake air dilution is greater than the threshold.

5. The method of claim 4 further comprising, after the intake air dilution decreases below the threshold, adjusting an air induction system (AIS) throttle arranged in an intake passage of the engine upstream of the compressor based on the desired intake air dilution.

6. The method of claim 5, further comprising adjusting the AIS throttle and adjusting the opening amount of the EGR valve based on a desired level of boost.

7. A system for an engine, comprising:
    a turbocharger comprising a compressor arranged in an intake passage and a turbine arranged in an exhaust passage;
    a low-pressure exhaust gas recirculation (EGR) system including an EGR valve arranged in an EGR passage, the EGR passage coupling the exhaust passage with the intake passage at a juncture upstream of the compressor;
    a compressor bypass valve (CBV) arranged in a CBV passage having a first end coupled with the intake passage downstream of the compressor and a second end coupled with the intake passage upstream of the juncture of the EGR passage and the intake passage;
    an intake oxygen sensor arranged in the intake passage downstream of the compressor and upstream of an intake throttle; and
    a control system in communication with the sensor, the control system including non-transitory instructions to reduce opening of the EGR valve upon increasing opening of the CBV, and then increase opening of the EGR valve only after the CBV closes and intake air dilution measured by the intake oxygen sensor falls below a threshold.

8. The system of claim 7, further comprising an air induction system (AIS) throttle arranged upstream of the compressor, EGR passage, and CBV passage, wherein the control system further includes non-transitory instructions to coordinate adjustment of the AIS throttle with adjustment of the EGR valve.

9. The system of claim 8, further comprising a throttle arranged downstream of the intake oxygen sensor and a wastegate arranged in a wastegate passage bypassing the turbine.

10. The system of claim 9, wherein the control system further includes non-transitory instructions to adjust the throttle, wastegate, EGR valve, and AIS throttle based on a desired airflow/torque and a desired boost.

11. The system of claim 10, wherein the engine includes identical twin turbochargers, and wherein compressors of the turbochargers communicate via a common intake passage downstream of the compressors, the intake oxygen sensor arranged in the common intake passage.

12. A method for exhaust gas recirculation (EGR) control in an engine, comprising:
    at tip out while low-pressure EGR is enabled, opening a compressor bypass valve (CBV) arranged in a CBV passage bypassing a turbocharger compressor and reducing opening of an EGR valve;
    monitoring a compressor surge risk estimate;
    after the compressor surge risk estimate decreases below a threshold, closing the CBV and adjusting opening of the EGR valve based on intake air dilution measured by an oxygen sensor downstream of the compressor and upstream of an intake throttle.

13. The method of claim 12, wherein the compressor surge risk estimate is determined based on a compressor pressure ratio and an air flow rate through the compressor.

14. The method of claim 12, wherein adjusting opening of the EGR valve based on intake air dilution downstream of the compressor comprises increasing opening of the EGR valve when the intake air dilution measured downstream of the compressor decreases below a threshold.

15. The method of claim 14, further comprising maintaining the reduced opening of the EGR valve while the intake air dilution measured downstream of the compressor is greater than the threshold.

16. The method of claim 15 further comprising, after intake air dilution decreases below the threshold, adjusting an air induction system (AIS) throttle arranged upstream of the compressor and the EGR valve based on a desired intake air dilution downstream of the compressor.

17. The method of claim 16, further comprising adjusting the EGR valve and the AIS throttle based on a desired level of boost.

18. The method of claim 16 further comprising, before tip out while EGR is enabled, controlling the EGR valve and AIS throttle based on the desired intake air dilution.

19. The method of claim 12 further comprising, at tip out while EGR is not enabled, opening the CBV until the compressor surge risk estimate decreases below the threshold.

* * * * *